United States Patent
Hart et al.

(10) Patent No.: US 10,523,003 B2
(45) Date of Patent: Dec. 31, 2019

(54) AUXILIARY POWER CIRCUIT AND METHOD OF USE

(71) Applicant: CUMMINS ENTERPRISE LLC, Indianapolis, IN (US)

(72) Inventors: Patrick Hammel Hart, Ballston Lake, NY (US); Darren Hickey, Halfmoon, NY (US); Honggang Wang, Clifton Park, NY (US)

(73) Assignee: CUMMINS ENTERPRISE INC., Indianapolis, IN (US)

( * ) Notice: Subject to any disclaimer, the term of this patent is extended or adjusted under 35 U.S.C. 154(b) by 371 days.

(21) Appl. No.: 15/419,776

(22) Filed: Jan. 30, 2017

(65) Prior Publication Data

US 2018/0219373 A1   Aug. 2, 2018

(51) Int. Cl.
| | |
|---|---|
| *H01H 35/14* | (2006.01) |
| *H02J 1/14* | (2006.01) |
| *H02J 7/00* | (2006.01) |
| *H02J 1/00* | (2006.01) |

(52) U.S. Cl.
CPC .............. *H02J 1/14* (2013.01); *H02J 7/0063* (2013.01); *H02J 2001/004* (2013.01)

(58) Field of Classification Search
CPC ....... H02J 1/14; H02J 7/0063; H02J 2001/004
USPC ...... 307/121, 9.1, 10.1; 429/12, 20, 23, 430, 429/432, 900; 320/124
See application file for complete search history.

(56) References Cited

U.S. PATENT DOCUMENTS

| | | | |
|---|---|---|---|
| 6,204,791 B1* | 3/2001 | Yamamoto | H03M 1/142 |
| | | | 341/154 |
| 7,132,185 B2 | 11/2006 | Wardrop et al. | |
| 7,226,678 B2 | 6/2007 | Kato et al. | |
| 8,808,934 B2 | 8/2014 | Wilson et al. | |
| 9,906,143 B1* | 2/2018 | Yu | H02M 3/33507 |
| 2005/0048335 A1 | 3/2005 | Fields et al. | |
| 2005/0275983 A1 | 12/2005 | Franklin et al. | |
| 2006/0046107 A1* | 3/2006 | Lindsey | H01M 8/04544 |
| | | | 700/295 |
| 2006/0051634 A1 | 3/2006 | Devries | |
| 2008/0265813 A1* | 10/2008 | Eschleman | H02P 3/22 |
| | | | 318/380 |
| 2009/0218175 A1* | 9/2009 | Wesson | B66B 1/302 |
| | | | 187/290 |
| 2010/0190074 A1 | 7/2010 | Shimura et al. | |
| 2013/0127261 A1* | 5/2013 | Kagawa | H01R 13/707 |
| | | | 307/125 |

FOREIGN PATENT DOCUMENTS

| | | |
|---|---|---|
| JP | 2006210240 A | 8/2006 |
| KR | 20070039361 A | 4/2007 |
| KR | 100911562 B1 | 8/2009 |

* cited by examiner

*Primary Examiner* — Rexford N Barnie
*Assistant Examiner* — Toan T Vu
(74) *Attorney, Agent, or Firm* — Barnes & Thornburg LLP

(57) ABSTRACT

An auxiliary power circuit includes an impedance circuit, a switch, and a controller. The switch is coupled in series with the impedance circuit. The switch is configured to selectively couple the impedance circuit to a power source. The controller is coupled to the switch. The controller is configured to close the switch when an output voltage of the power source exceeds a voltage threshold.

18 Claims, 5 Drawing Sheets

AUXILIARY POWER CIRCUIT AND METHOD OF USE

BACKGROUND

The field of the disclosure relates generally to auxiliary power circuits and, more particularly, to low-current voltage protection circuit for electrical equipment powered by fuel cells, batteries, and certain other power sources that provides power to auxiliary loads related to power production by the power source, and methods of use.

Many known electrical systems utilize one or more power sources to provide the necessary voltage and current to operate various electrical equipment. Such electrical systems are typically designed to operate at a nominal design point defined by a nominal output current and a nominal output voltage. For a given application, a power source is selected based on the load. Further, multiples of the power source may be connected in series, or "stacked," to achieve higher output voltages to service the load. Consequently, for certain power sources, the output voltage during a low-current condition or an open circuit condition is significantly larger than the nominal voltage for which the electrical system was designed. To accommodate the large low-current or open circuit voltages, electrical equipment on the load side is generally over-rated with respect to the nominal voltage design point. Such over-rating introduces excess cost and inefficient operation of the electrical system. Alternatively, the stacking of power sources is limited, which also introduces cost in the form of additional hardware, including, for example, and without limitation, multiple stacks of power sources, additional wiring, and additional connections.

BRIEF DESCRIPTION

In one aspect, a auxiliary power circuit is provided. The auxiliary power circuit includes an impedance circuit, a switch, and a controller. The switch is coupled in series with the impedance circuit. The switch is configured to selectively couple the impedance circuit to a power source. The controller is coupled to the switch. The controller is configured to close the switch when an output voltage of the power source exceeds a voltage threshold.

In another aspect, an electrical system is provided. The electrical system includes a power source, an auxiliary power circuit, and a controller. The auxiliary power circuit includes an auxiliary load. The auxiliary power circuit is coupled to the power source and is configured to selectively couple the power source to a load. The controller is coupled to the auxiliary power circuit. The controller is configured to operate the auxiliary power circuit to draw a predetermined current through the auxiliary load when an output voltage of the power source exceeds a voltage threshold.

In yet another aspect, a method of operating an auxiliary power circuit to power an auxiliary load is provided. The method includes measuring an output voltage of a power source. The method includes closing a switch of the auxiliary power circuit to couple an auxiliary load of the auxiliary power circuit to the power source when the output voltage exceeds a first voltage threshold. The method includes drawing a predetermined current from the power source through the auxiliary load to reduce the output voltage. The method includes opening the switch to decouple the auxiliary load when the output voltage falls below a second voltage threshold.

DRAWINGS

These and other features, aspects, and advantages of the present disclosure will become better understood when the following detailed description is read with reference to the accompanying drawings in which like characters represent like parts throughout the drawings, wherein.

Figure 1:
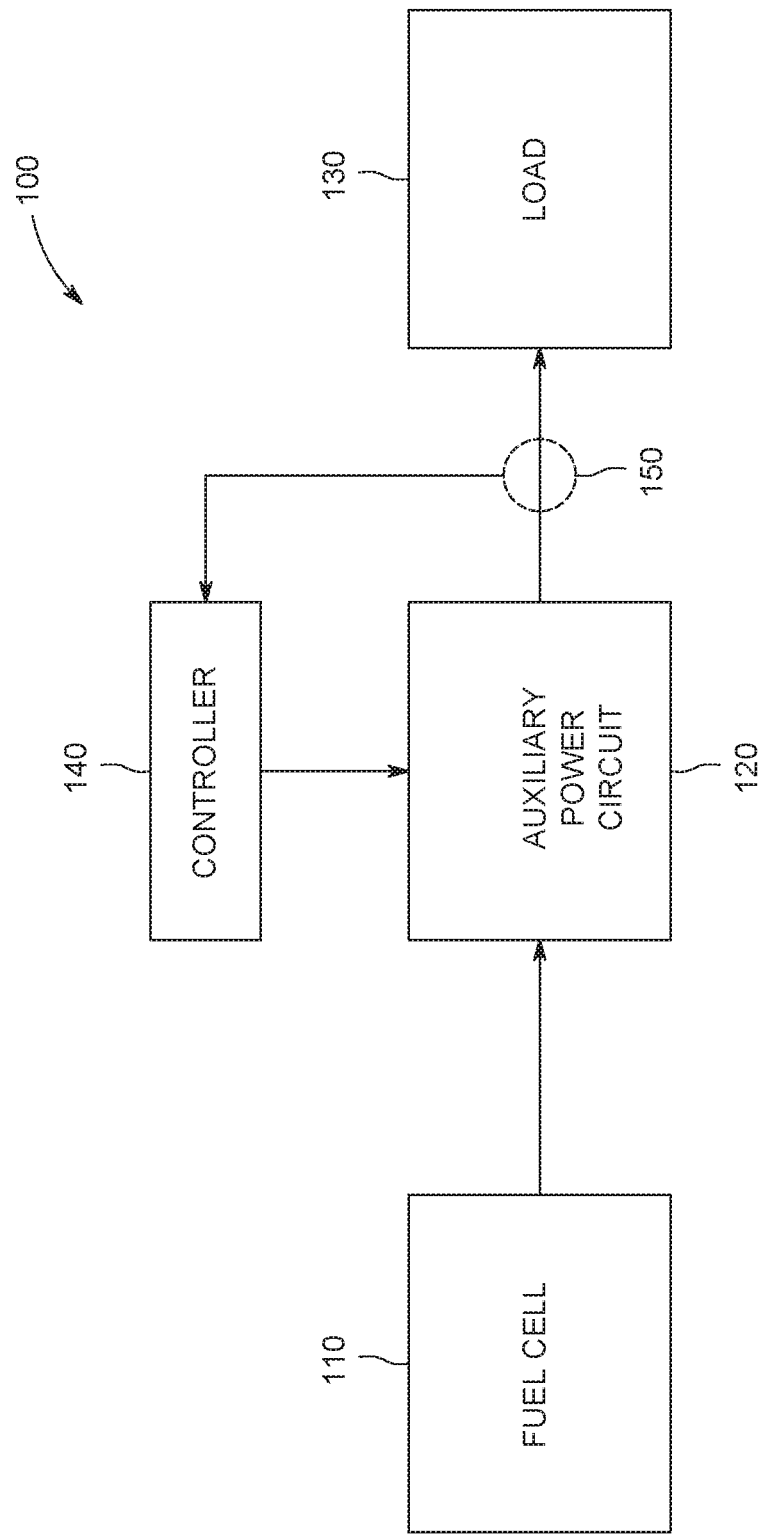
FIG. 1 is a block diagram of an exemplary electrical system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the present disclosure provide auxiliary power circuits. More specifically, embodiments of the present disclosure describe auxiliary power circuits for electrical equipment powered by fuel cells, batteries, and other power sources that exhibit a high-sloped current-voltage (I/V) curve at low-current or open circuit operation. Further, the present disclosure describes an auxiliary power circuit that utilizes a network of switches and auxiliary loads to maintain a minimum current draw on the power sources to operate the electrical system within the ratings of the electrical equipment on the load side. The minimum current is a predetermined value based on the ratings of the electrical equipment and the I/V curve for the power source. The auxiliary power circuits described herein facilitate use of more appropriately rated electrical equipment on the load side, and utilization of larger stacks of power sources. Moreover, the auxiliary loads utilized to draw the minimum current are typically necessary loads for power production by fuel cells, for example, including electric steam generators, electric heaters, and blowers.

FIG. 1 is a block diagram of an exemplary electrical system 100. Electrical system 100 includes a fuel cell 110, an auxiliary power circuit 120, and a load 130. Fuel cell 110 provides power to load 130 through auxiliary power circuit 120. Auxiliary power circuit 120 is coupled to a controller 140 that controls operation of auxiliary power circuit 120 to provide a minimum current draw on fuel cell 110. The minimum current is a predetermined value based on the ratings of the electrical equipment in load 130 and the I/V curve for the power source, i.e., fuel cell 110. Controller 140, in certain embodiments, includes a processor programmed to control a network of switches within auxiliary power circuit 120 to connect an appropriate auxiliary load to fuel cell 110 to create the minimum current draw. Controller 140, in certain embodiments, controls auxiliary power circuit 120 based on a measured current from a sensor 150.

Figure 2:
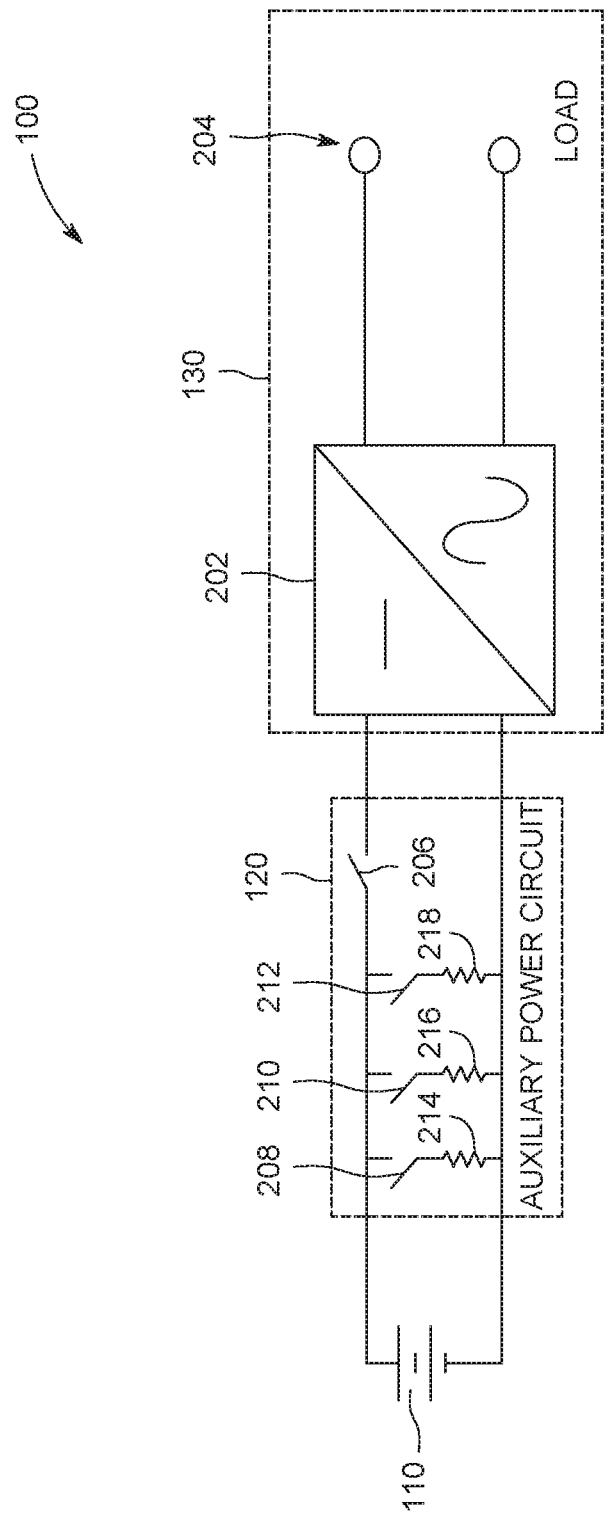
FIG. 2 is a schematic diagram of the electrical system shown in FIG. 1.

FIG. 2 is a schematic diagram of electrical system 100 (shown in FIG. 1). Electrical system 100 includes fuel cell 110, auxiliary power circuit 120, and load 130 (shown in FIG. 1). Load 130 includes an inverter 202 coupled between auxiliary power circuit 120 and an output stage 204. Inverter 202 is configured to convert a direct current (DC) output voltage generated by fuel cell 110 to an alternating current (AC) output voltage to be provided at output stage 204. Inverter 202 operates with variable efficiency as a function of input voltage, output current, and switching frequency, for example, and without limitation. Inverter 202 further defines a rated operating voltage that is also referred to as an equipment voltage limit, or sometimes referred to as a maximum operating voltage. Output stage 204 is configured to be coupled to electrical equipment, an AC bus, or any other suitable AC load. The rated operating voltage of inverter 202 or any other AC load coupled to output stage 204 defines a voltage threshold according to which auxiliary power circuit 120 is operated.

Auxiliary power circuit 120 includes a switch 206 coupled in series between fuel cell 110 and load 130. Switch 206 may be implemented as, for example, and without limitation, an electro-mechanical contactor, a relay, a solid-state contactor, semiconductor switch, or other suitable electrical switch for opening and closing the circuit between fuel cell 110 and load 130. Switch 206 is controlled by a control signal transmitted from controller 140 (shown in FIG. 1). In some embodiments, switch 206 is normally open and is commutated to a closed position when the control signal provides a sufficient voltage. In alternative embodiments, switch 206 may be embodied by a normally closed switch. Switch 206 is controlled based on an output voltage from fuel cell 110 to be provided to load 130. When the output voltage form fuel cell 110 exceeds the voltage threshold defined by load 130 and cannot otherwise be controlled, switch 206 is opened and load 130 is disconnected from fuel cell 110.

Auxiliary power circuit 120 includes a switch 208, a switch 210, and a switch 212. Auxiliary power circuit 120 also includes an auxiliary load 214, an auxiliary load 216, and an auxiliary load 218, each respectively coupled in series with switches 208, 210, and 212. Auxiliary loads 214, 216, and 218 are illustrated as impedances in FIG. 2, to simplify auxiliary power circuit 120. Switches 208, 210, and 212 are configured to selectively couple auxiliary loads 214, 216, and 218 to fuel cell 110. Similar to switch 206, switches 208, 210, and 212 may be implemented as, for example, and without limitation, an electro-mechanical contactor, a relay, a solid-state contactor, semiconductor switch, or other suitable electrical switch for coupling and decoupling auxiliary loads 214, 216, and 218. Further, switches 208, 210, and 212 are controlled by a control signal transmitted from controller 140 (shown in FIG. 1). Auxiliary loads 214, 216, and 218 may be implemented as, for example, and without limitation, a heating system, air movers, and steam generators for fuel cell 110. Heating systems are typically utilized to maintain a desired temperature in fuel cell 110 for efficient conversion of fuel to electrical power. Likewise, electric steam generators may be utilized to convert liquid water to water vapor for carrying out the chemical process by which the fuel is converted. Air movers, or blowers, are utilized to distribute vapors appropriately within fuel cell 110. In alternative embodiments, auxiliary loads 214, 216, and 218 may include any other suitable electrical load related to power production by fuel cell 110 or other suitable power source.

During operation of auxiliary power circuit 120, when the output voltage of fuel cell 110 exceeds the voltage threshold, one or more of auxiliary loads 214, 216, and 218 are selected, by controller 140, to be coupled to fuel cell 110 to draw a minimum current from fuel cell 110. The minimum current results in a voltage drop across fuel cell 110. The one or more selected auxiliary loads from auxiliary loads 214, 216, and 218 are selected to induce a sufficient voltage drop across fuel cell 110 to reduce the output voltage to below the voltage threshold. When the output voltage of fuel cell 110 falls below the voltage threshold, the one or more selected auxiliary loads are decoupled by opening their corresponding switch, among switches 208, 210, and 212. In certain embodiments, a portion of the one or more selected auxiliary loads are decoupled such that the load presented across fuel cell 110 is slowly decreased to prevent voltage spikes at load 130. In certain embodiments, a second voltage threshold is defined below the first voltage threshold. The second voltage threshold operates as a buffer to prevent alternatingly coupling and decoupling the one or more selected auxiliary loads as the output voltage of fuel cell 110 rises and falls around the first voltage threshold.

Figure 3:
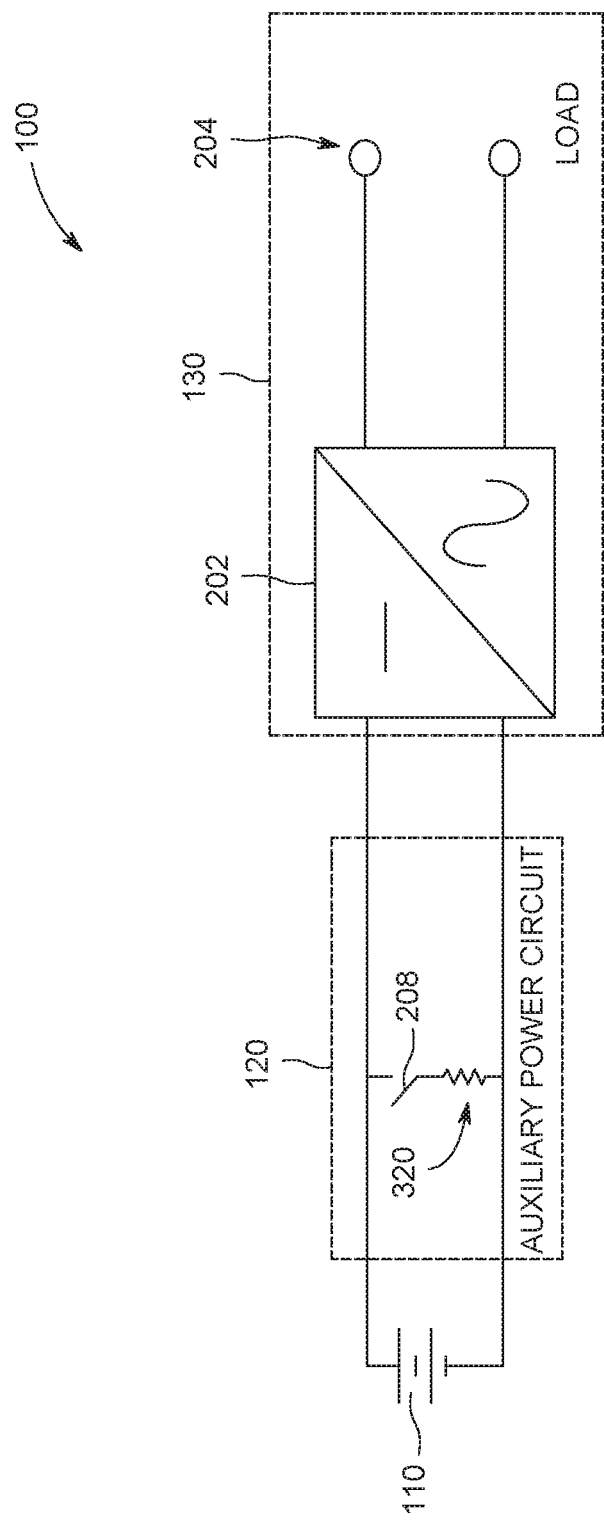
FIG. 3 is an alternative schematic diagram of the electrical system shown in FIG. 1.

FIG. 3 is a schematic diagram of an alternate embodiment of electrical system 100 (shown in FIG. 1). In the embodiment of FIG. 3, auxiliary power circuit 120 includes switch 208 and an impedance circuit 320. Impedance circuit 320, in certain embodiments, includes one or more passive auxiliary loads that are selectively coupled to fuel cell 110 by switch 208. In one embodiment, for example, and without limitation, impedance circuit 320 includes an electric heater that is configured to be controlled by controller 140. In another embodiment, for example, and without limitation, impedance circuit 320 includes an active load, such as a variable load DC-to-DC converter that is configured to be controlled by controller 140. In such an embodiment, the variable load DC-to-DC converter may be operated at various load set points to reduce power drawn from the grid and to utilize excess power from fuel cell 110 and facilitate the desired voltage drop across fuel cell 110 and load 130.

Figure 4:
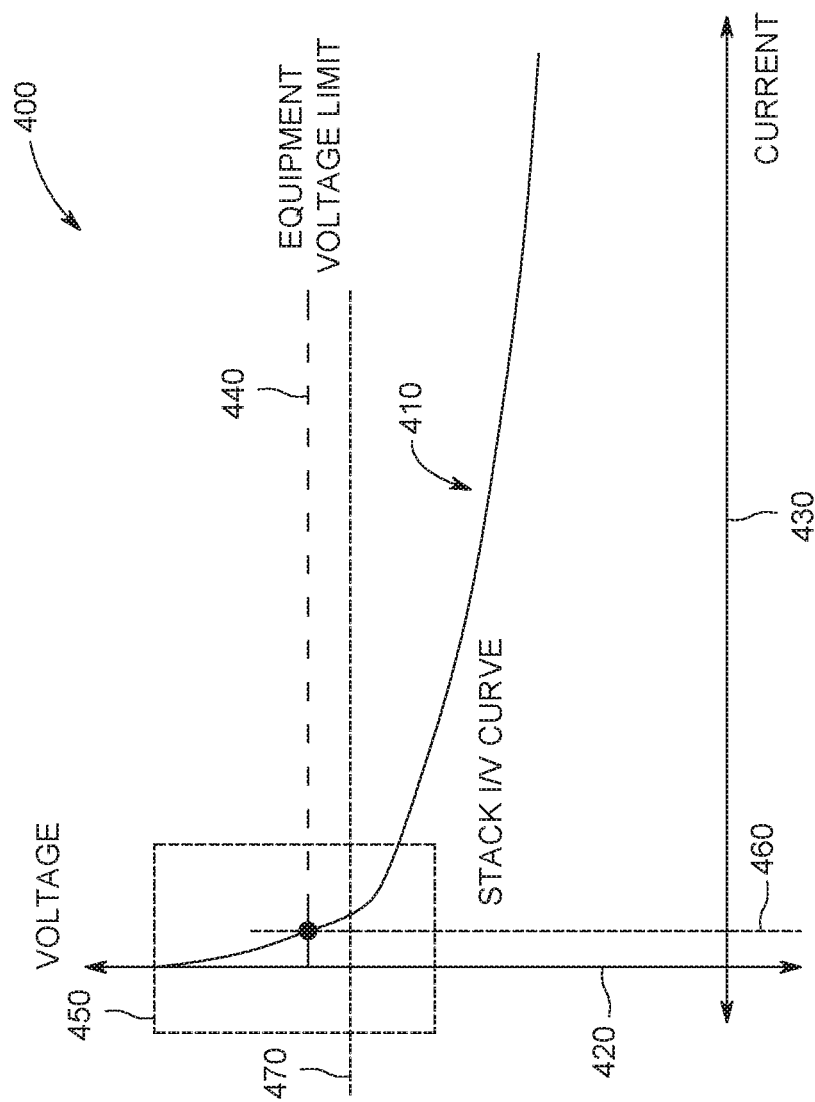
FIG. 4 is a plot of an exemplary current-voltage (I/V) curve for a power source for use in the electrical system shown in FIGS. 1-3.

FIG. 4 is a plot 400 of an exemplary I/V curve 410 for a power source, such as fuel cell 110 (shown in FIGS. 1-3), a battery, a solar cell, or any other suitable power source. Plot 400 includes a vertical axis representing voltage in Volts, i.e., a voltage axis 420. Plot 400 includes a horizontal axis representing current in Amperes, i.e., a current axis 430. For reference, an equipment voltage limit 440 is plotted, represented by a dashed line. Equipment voltage limit 440 is a voltage threshold defined according to the electrical equipment to be powered by the power source.

I/V curve 410 is plotted as a voltage as a function of current. I/V curve 410 exhibits a high-slope region 450. High-slope region 450 illustrates significantly higher output voltages of the power source in low-current and open-circuit conditions. Plot 400 includes a minimum current 460, illustrated by a dashed line through the intercept of equipment voltage limit 440 and I/V curve 410. Plot 400 also includes an exemplary second threshold 470. For example, when auxiliary power circuit 120 (shown in FIGS. 1-3) is engaged and draws minimum current 450, the selected auxiliary load is not decoupled from the power source until the output voltage falls below second threshold 470.

Figure 5:
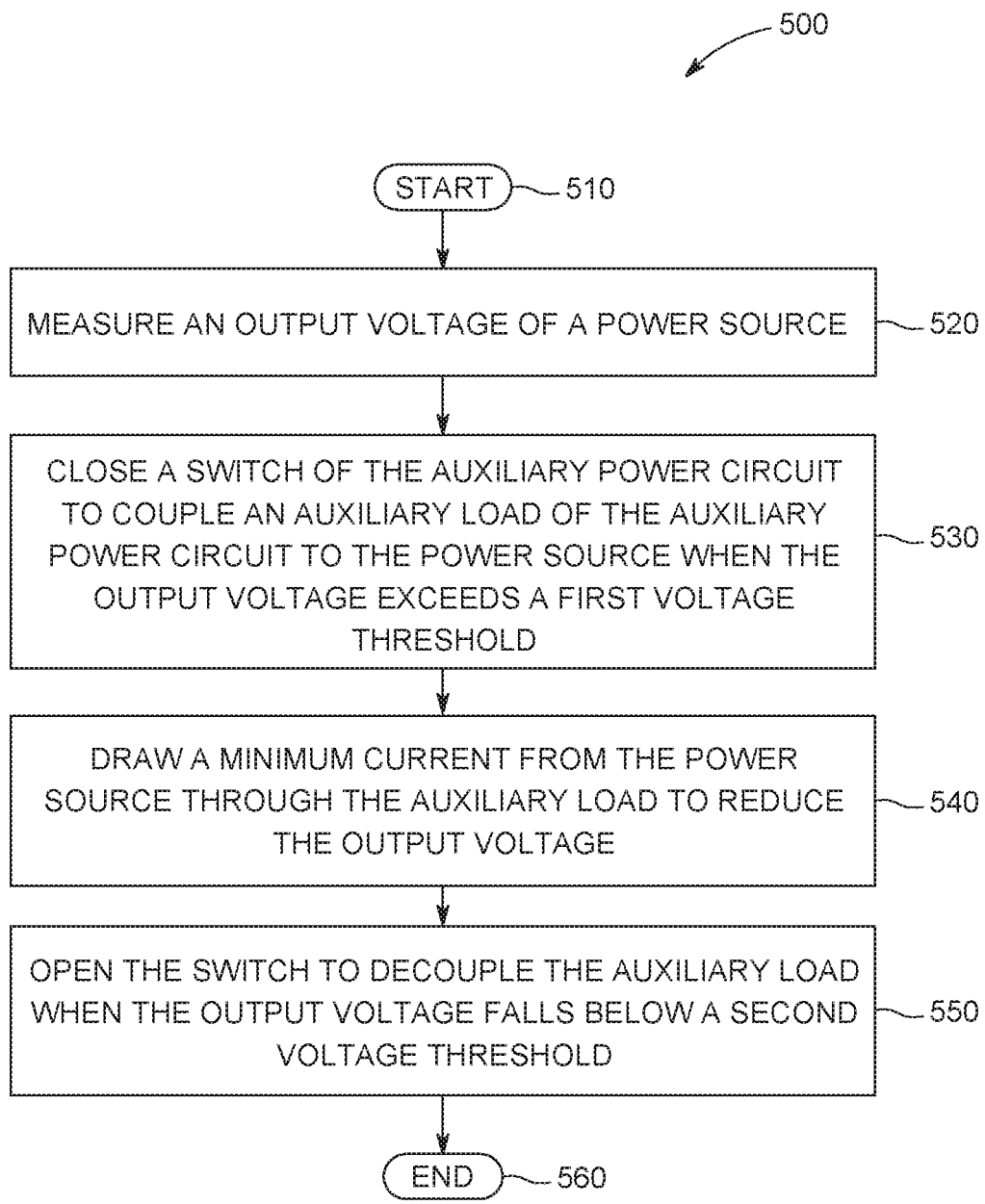
FIG. 5 is a flow diagram of an exemplary method of using the electrical system shown in FIGS. 1-3.

FIG. 5 is a flow diagram of an exemplary method 500 of using electrical system 100 (shown in FIGS. 1-3). Method 500 begins at a start step 510. At a measuring step 520, an output voltage of a power source, such as, for example, and without limitation, fuel cell 110, is measured by a sensor 150. The output voltage measurement is provided by sensor 150 to controller 140.

Controller 140 selects one or more auxiliary loads from among auxiliary loads 208, 210, and 212 to be coupled to the power source. The selected auxiliary loads are selected based on the output voltage measurement to draw minimum current 460 (shown in FIG. 4). When the output voltage exceeds a first voltage threshold, such as equipment voltage limit 440 (shown in FIG. 4), corresponding switches, from among switches 214, 216, and 218, are closed in a closing step 530. Closing of the corresponding switches couples the selected passive auxiliary loads to the power source. In alternative embodiments, active loads, such as a variable DC to DC converter, are set to an increased load set point. At a protection step 540, the selected auxiliary loads draw minimum current 460 from the power source to reduce the output voltage. When the output voltage falls below second threshold 470 (shown in FIG. 4), the corresponding switches are opened at an opening step 550 to decouple the selected auxiliary loads. The method terminates at an end step 560.

The above described embodiments of auxiliary power circuits provide auxiliary power circuits for electrical equipment powered by fuel cells, batteries, and other power sources that exhibit a high-sloped I/V curve at low-current or open circuit operation. Further, the present disclosure describes an auxiliary power circuit that utilizes a network of switches and auxiliary loads to maintain a minimum current draw on the power sources to operate the electrical system within the ratings of the electrical equipment on the load side. The minimum current is a predetermined value based on the ratings of the electrical equipment and the I/V curve for the power source. The auxiliary power circuits described herein facilitate use of more appropriately rated electrical equipment on the load side, and utilization of larger stacks of power sources. Moreover, the auxiliary loads utilized to draw the minimum current are typically necessary loads for power production by fuel cells, for example, including electric steam generators, electric heaters, and blowers.

An exemplary technical effect of the methods, systems, and apparatus described herein includes at least one of: (a) providing a minimum current draw on power sources in electrical systems; (b) protecting electrical equipment on the load side from low-current and open circuit voltages; (c) facilitating larger stacks of power sources to provide increased total power for the load; (d) reducing the rating requirements for electrical equipment on the load side; (e) reducing costs in the electrical system through lower-rated electrical equipment, fewer stacks of power sources, and less hardware; (f) reducing physical footprint of power sources through larger stacks; (g) improving efficiency of inverters connected to the power source through alignment of the inverters' I/V curve and the power source's I/V curve; and (h) improving efficiency of power generation by fuel cells by powering auxiliary loads necessary for the fuel cell under low-current conditions.

Exemplary embodiments of methods, systems, and apparatus for low-current voltage protection are not limited to the specific embodiments described herein, but rather, components of systems and/or steps of the methods may be utilized independently and separately from other components and/or steps described herein. For example, the methods may also be used in combination with other non-conventional low-current voltage protection, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An auxiliary power circuit comprising:
   a plurality of auxiliary loads coupled in parallel, said plurality of auxiliary loads including an impedance circuit;
   a plurality of respective switches serially coupled to said plurality of auxiliary loads, said plurality of respective switches configured to selectively couple the plurality of auxiliary loads to a power source; and
   a controller coupled to said plurality of respective switches, said controller configured to:
   select said impedance circuit from among the plurality of auxiliary loads based on the output voltage; and
   close a first switch of the plurality of respective switches upon selection of said impedance circuit.

2. The auxiliary power circuit in accordance with claim 1, wherein said impedance circuit comprises an auxiliary load coupled in series with said first switch.

3. The auxiliary power circuit in accordance with claim 2, wherein said auxiliary load comprises an electric heater associated with the power source.

4. The auxiliary power circuit in accordance with claim 1, wherein said first switch comprises an electro-mechanical contactor configured to be commutated based on a control signal transmitted from said controller.

5. The auxiliary power circuit in accordance with claim 1 further comprising a disconnect switch serially coupled between the power source and a load, said disconnect switch configured to open when the output voltage exceeds the voltage threshold.

6. The auxiliary power circuit in accordance with claim 1 further comprising a voltage sensor configured to measure the output voltage of the power source, said voltage sensor coupled to said controller.

7. The auxiliary power circuit in accordance with claim 1, wherein said impedance circuit comprises a variable load DC-to-DC converter coupled in series with said first switch.

8. An electrical system comprising:
   a power source;
   an auxiliary power circuit configured to power an auxiliary load, said auxiliary power circuit coupled to said power source and configured to selectively couple said power source to a load, said auxiliary power circuit comprising:
   a plurality of auxiliary loads coupled in parallel with each other and the load, said plurality of auxiliary loads including an impedance circuit; and
   a plurality of respective switches serially coupled to said plurality of auxiliary loads, said plurality of respective switches configured to selectively couple the plurality of auxiliary loads to the power source; and
   a controller coupled to said auxiliary power circuit, said controller configured to operate said auxiliary power circuit to draw a predetermined current through a first auxiliary load of the plurality of auxiliary loads when an output voltage of said power source exceeds a voltage threshold, said controller further configured to:
   select said impedance circuit from among the plurality of auxiliary loads based on the output voltage; and
   close said switch upon selection of said impedance circuit.

9. The electrical system in accordance with claim 8, wherein said power source comprises a fuel cell stack having an open-circuit output voltage that exceeds the voltage threshold.

10. The electrical system in accordance with claim 8, wherein said controller is further configured to generate and transmit a plurality of control signals to commutate said plurality of respective switches.

11. The electrical system in accordance with claim 8 further comprising a voltage sensor coupled to said controller, said voltage sensor configured to measure the output voltage of said power source.

12. The electrical system in accordance with claim 8, wherein said controller is further configured to select said first auxiliary load based on the output voltage to induce the predetermined current.

13. The electrical system in accordance with claim 8 further comprising an inverter configured to convert a direct current (DC) voltage generated by said power source to an alternating current (AC) voltage to provide to the load, wherein said inverter defines the voltage threshold.

14. The electrical system in accordance with claim 8, wherein said auxiliary power circuit includes a variable load DC-to-DC converter configured to be selectively set to a variable load set point.

15. A method of operating an auxiliary power circuit to power an auxiliary load, said method comprising:
   measuring an output voltage of a power source, wherein measuring the output voltage comprises receiving an output voltage measurement from a voltage sensor at a controller;
   closing a switch of the auxiliary power circuit to couple an auxiliary load of the auxiliary power circuit to the power source when the output voltage exceeds a first voltage threshold;
   drawing a predetermined current from the power source through the auxiliary load to reduce the output voltage;
   opening the switch to decouple the auxiliary load when the output voltage falls below a second voltage threshold; and
   comparing the output voltage measurement to the second voltage threshold, wherein the second voltage threshold is defined as less than the first voltage threshold.

16. The method in accordance with claim 6 further comprising comparing the output voltage measurement to the first voltage threshold, wherein the first voltage threshold is defined as a voltage limit for electrical equipment configured to be powered by the power source.

17. A method of operating an auxiliary power circuit to power an auxiliary load, said method comprising:
   measuring an output voltage of a power source, wherein measuring the output voltage comprises receiving an output voltage measurement from a voltage sensor at a controller;
   closing a switch of the auxiliary power circuit to couple an auxiliary load of the auxiliary power circuit to the power source when the output voltage exceeds a first voltage threshold;
   drawing a predetermined current from the power source through the auxiliary load to reduce the output voltage;
   opening the switch to decouple the auxiliary load when the output voltage falls below a second voltage threshold; and
   selecting, by the controller and based on the output voltage measurement, the auxiliary load and the switch from among a plurality of different auxiliary loads and a plurality of respective switches.

18. The method in accordance with claim 17 further comprising:
   selecting a second auxiliary load and a second corresponding switch from among the plurality of auxiliary loads and the plurality of respective switches when the output voltage falls below a second voltage threshold; and
   closing the second corresponding switch to couple the second auxiliary load to the power source.

* * * * *